No. 624,527. Patented May 9, 1899.
M. OTTO.
APPARATUS FOR PURIFYING WATER.
(Application filed Aug. 19, 1898.)

(No Model.)

Witnesses:
E. B. Bolton

Inventor:
Marius Otto
By Richards
his Attorneys

UNITED STATES PATENT OFFICE.

MARIUS OTTO, OF PARIS, FRANCE.

APPARATUS FOR PURIFYING WATER.

SPECIFICATION forming part of Letters Patent No. 624,527, dated May 9, 1899.

Application filed August 19, 1898. Serial No. 689,031. (No model.)

*To all whom it may concern:*

Be it known that I, MARIUS OTTO, doctor of science, residing at Paris, France, have invented Apparatus for the Purification of Water, of which the following is a specification.

This invention relates to an apparatus intended for the purification of water on a commercial scale by submitting it to the action of ozone; but the apparatus may also be utilized for submitting liquids of any kind to the action of ozone.

My improved apparatus enables the following advantages to be obtained:

First. The water and the ozone enter into intimate contact.

Second. The duration of the action of the ozone may be readily regulated and likewise the relative volumes of water and ozone taking part in the reaction.

Third. The water when once it has been treated is protected from any fresh pollution.

Figure 1:
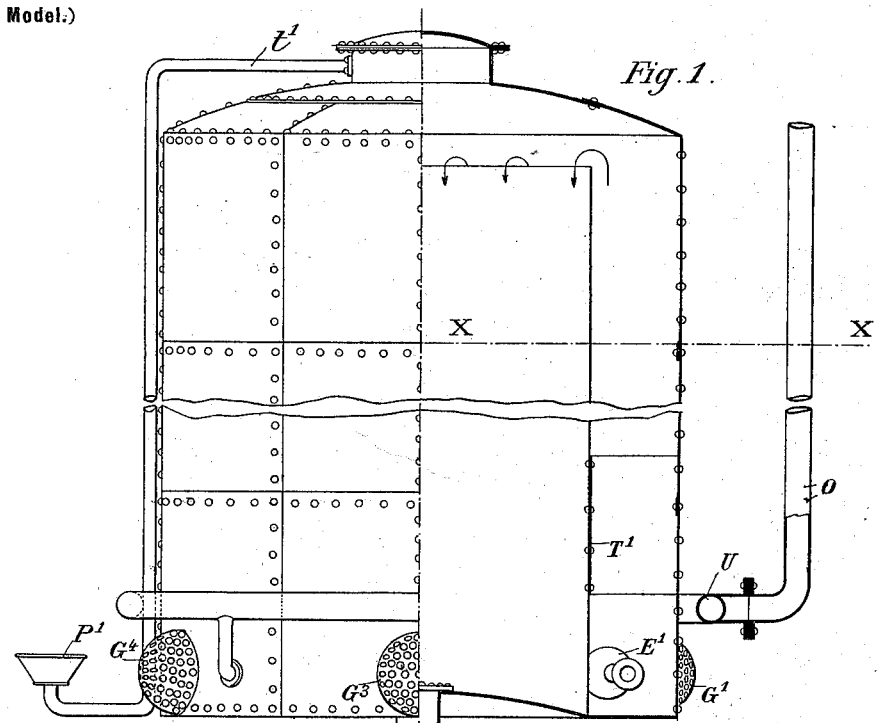
Figure 2:
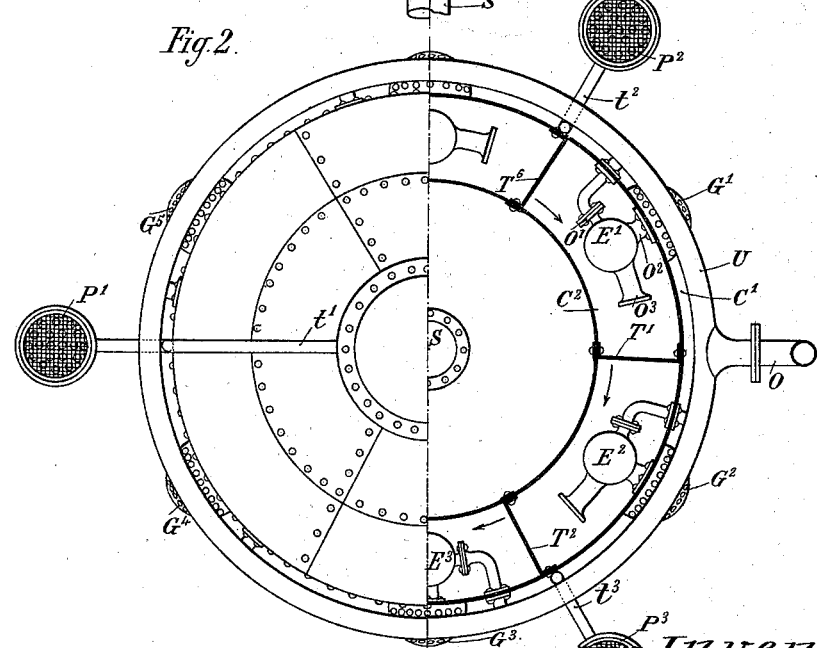
Figure 3:
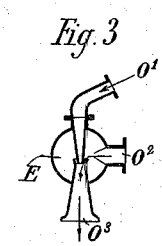

In the accompanying drawings, Figure 1 shows the apparatus half in section and half in elevation. Fig. 2 represents the said apparatus, one half in plan and the other half in horizontal section, upon the line X X of Fig. 1; and Fig. 3 is a sectional view of the injector in which the intimate mixing of the water and ozone takes place.

The apparatus may be arranged directly in a filtering-reservoir beneath the water-outlet. Within the cylindrical vessel $C'$ is arranged another cylinder $C^2$, which is open at its upper portion. The water enters the apparatus through the sieves $G'$ $G^2$. The ozone is admitted through the pipe O and the crown U, which distributes it to the injectors $E'$ $E^2$ $E^3$. Each of these injectors consists of a vessel E, Fig. 3, of cylindrical or spherical form, provided with a lateral orifice $O^2$. In this vessel fit one within the other two tubes or nozzles $O'$ $O^3$ of conical shape. The current of ozonated oxygen or of ozonated air enters the injector through the orifice $O'$ and issues through the orifice $O^3$, carrying with it a current of water which whirls around in the space comprised between the cylinders $C'$ and $C^2$. This current is broken up by the plates $T'$ $T^2$, which form baffles. The effect of the injectors may be increased by the addition of mechanical agitators serving to stir vigorously the mixture of water and ozone.

The destruction of microbes and of organic substances is accompanied by the production of very remarkable phenomena of phosphorescence. The water becomes luminous and retains its luminosity for several seconds.

The excess of air or of ozone escapes through the tubes $t'$ $t^2$ $t^3$, arranged at the upper portion of the apparatus and provided with funnel-shaped discharge-apertures $P'$ $P^2$ $P^3$. The ozonated water rises above the upper edge of the cylinder $C^2$ and escapes through the pipe S, which communicates directly with the distributing-mains.

By means of extremely simple accessory appliances a certain number of injectors only may be caused to operate, the supply of water to each of them being either partially or totally cut off.

The water is prevented from being forced back into the ozone-supply pipe O and into the exhaust-tubes $t'$ $t^2$ $t^3$ by means of suitable valves.

The water is not able to reach the distributing-mains except by passing through the injectors. It is thus certain that each particle of water will be submitted to the action of the ozone.

The period during which the water and the ozone remain in contact depends upon the height of the annular space comprised between the cylinders $C'$ $C^2$.

If it is desired to arrange my apparatus outside the filtering-reservoir, it is only necessary to conduct the water to the injectors through a circular conduit. In such a case the air and the ozone escape freely or are collected for the purpose of again being submitted to the action of the electric effluvium. This arrangement may be adopted when the impurity of the water is such that it is necessary to arrange several apparatus in series.

I claim—

In combination, the outer tank $C'$ having a cover with outlets for the ozone, the inner tank $C^2$ having its upper end opening into the space between the two tanks, and having a discharge for the water at its lower end, the space between the tanks being closed at the bottom, the inlets for the water through the lower parts of the outer tank, the injectors connected with the water-inlets and situated at the lower part of the space between the tanks, ozone-supply pipes leading to the injectors and baffle-plates in the space between the tanks, substantially as described.

In witness whereof I have hereunto set my hand in presence of two witnesses.

MARIUS OTTO.

Witnesses:
   EMILE BERTEO,
   EDWARD P. MACLEAN.